(12) United States Patent
Jiang

(10) Patent No.: US 11,381,497 B2
(45) Date of Patent: Jul. 5, 2022

(54) PATH SELECTION METHOD AND DEVICE

(71) Applicant: New H3C Technologies Co., Ltd., Hangzhou (CN)

(72) Inventor: Wendong Jiang, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 150 days.

(21) Appl. No.: 16/765,608

(22) PCT Filed: Nov. 30, 2018

(86) PCT No.: PCT/CN2018/118651
§ 371 (c)(1),
(2) Date: May 20, 2020

(87) PCT Pub. No.: WO2019/105469
PCT Pub. Date: Jun. 6, 2019

(65) Prior Publication Data
US 2020/0304400 A1 Sep. 24, 2020

(30) Foreign Application Priority Data
Nov. 30, 2017 (CN) .......................... 201711235845.9

(51) Int. Cl.
*H04L 45/12* (2022.01)
*H04L 45/16* (2022.01)

(52) U.S. Cl.
CPC ............ *H04L 45/123* (2013.01); *H04L 45/16* (2013.01)

(58) Field of Classification Search
CPC ..... H04L 45/123; H04L 45/16; H04L 45/125; H04L 47/70; H04L 41/084; H04L 45/56
See application file for complete search history.

(56) References Cited

U.S. PATENT DOCUMENTS

| 2009/0161541 | A1* | 6/2009 | Harhira | H04L 47/70 370/230.1 |
| 2014/0177471 | A1* | 6/2014 | Kharitonov | H04L 41/084 370/254 |

(Continued)

FOREIGN PATENT DOCUMENTS

| CN | 101777990 | 7/2010 |
| CN | 103685025 | 3/2014 |

(Continued)

OTHER PUBLICATIONS

International Search Report and Written Opinion issued in corresponding PCT Application No. PCT/CN2018/118651, dated Feb. 20, 2019 (English Translation Provided).

*Primary Examiner* — Kiet Tang
(74) *Attorney, Agent, or Firm* — Norton Rose Fulbright US LLP

(57) ABSTRACT

The present disclosure provides a path selection method and apparatus. The method comprises: receiving a traffic scheduling request, wherein the traffic scheduling request comprises a requirement for path selection, a source node, and a destination node; determining, for each dedicated line cloud comprising both a source virtual node connected with the source node and a destination virtual node connected with the destination node, a dedicated line corresponding to the dedicated line cloud as a traffic forwarding path when static attribute of a link between the source node and the respective source virtual node and a link between the destination node and the respective destination virtual node, and/or a dynamic attribute of a link between the respective source virtual node and the respective destination virtual node satisfy the requirement for path selection. The present disclosure can implement path selection based on bandwidth and quality in a point-to-multipoint network by a controller.

13 Claims, 6 Drawing Sheets

(56) References Cited

U.S. PATENT DOCUMENTS

2016/0323182 A1\* 11/2016 Segal ................ H04L 45/56
2017/0012816 A1   1/2017 Park et al.

FOREIGN PATENT DOCUMENTS

CN   106789650   5/2017
CN   106817306   6/2017

\* cited by examiner

PATH SELECTION METHOD AND DEVICE

CROSS-REFERENCE TO RELATED APPLICATIONS

The present application is a national phase under 35 U.S.C. § 371 of International Application No. PCT/CN2018/118651, filed Nov. 30, 2018, which claims the benefit of priority to Chinese Patent Application No. 201711235845.9, filed with the China National Intellectual Property Administration on Nov. 30, 2017, entitled "Path Selection Method and Apparatus", each of which are incorporated herein by reference in their entirety.

BACKGROUND

An SDN (Software Defined Network) is a new type of innovative network architecture, and is an implementation mode of network virtualization, which realizes a flexible control of network traffic by separating a control plane of a network device from its data plane.

However, it is found in practice that with the increasing complexity of network deployment, a point-to-multipoint model based on the links between some nodes in the SDN may be formed, that is, there is a case where a certain node is connected simultaneously with multiple other nodes via one interface, a schematic diagram of which may be as shown in FIG. 1. For the point-to-multipoint model, multiple links corresponding to one interface share bandwidth, wherein the node A is connected with the node B, the node C, and the node D via the interface, which makes it difficult for an SDN controller to implement path selection based on bandwidth.

DETAILED DESCRIPTION

In order to enable those skilled in the art to better understand the technical solutions in the present disclosure, related terms which appear in the present disclosure will be first explained. For simplicity and illustrative purposes, the present disclosure is described by referring mainly to example(s) thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

Traffic scheduling refers to monitoring traffic which enters a router; allocating bandwidth according to factors such as type of the traffic and emergency situation involving the traffic; and executing a corresponding traffic control policy and forwarding policy. In numerous application scenarios, the traffic scheduling controls and forwards traffic based on path selection, that is, when there are multiple paths to arrive at a destination node, an optimal path is selected from the multiple paths to forward traffic.

At present, traffic scheduling in an SDN is generally designed and realized based on a point-to-point model, and all attributes are carried on links, including static attributes such as allocable bandwidth, cost, etc., as well as dynamic attributes such as quality information such as delay, packet loss rate, jitter, etc. An implementation mode of path selection in the SDN will be first described briefly below.

An SDN controller can easily implement path selection based on bandwidth and quality in a point-to-point model:

wherein the principle of the SDN controller selecting a path based on bandwidth in the point-to-point model is: a minimum value of the remaining allocable bandwidth (allocable bandwidth subtracted by allocated bandwidth) of each link on the path is greater than or equal to the bandwidth required for services; and the principle of the SDN controller selecting a path based on quality in the point-to-point model is: a superimposition of quality of each link on the path satisfies a requirement for quality for services, for example, if a packet loss rate required for services is less than 10%, then the product of pass rates of all the links on the path should be greater than 90%.

Figure 1:
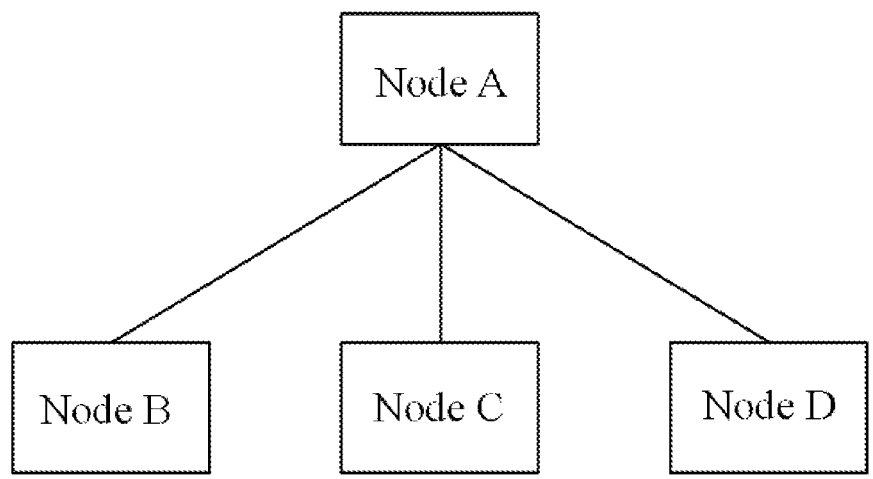
FIG. 1 is a schematic diagram of a point-to-multipoint model provided in the present disclosure.

However, as shown in FIG. 1, interfaces of three links connected with the node A share bandwidth in a point-to-multipoint model in the SDN, which makes it difficult for the SDN controller to implement path selection based on bandwidth.

In order to enable the objects, features, and advantages of the present disclosure to be more apparent and understandable, the technical solutions in the present disclosure will be described below in further detail with reference to the accompanying drawings.

A network architecture applicable to the present disclosure will be first described briefly below.

Figure 2:
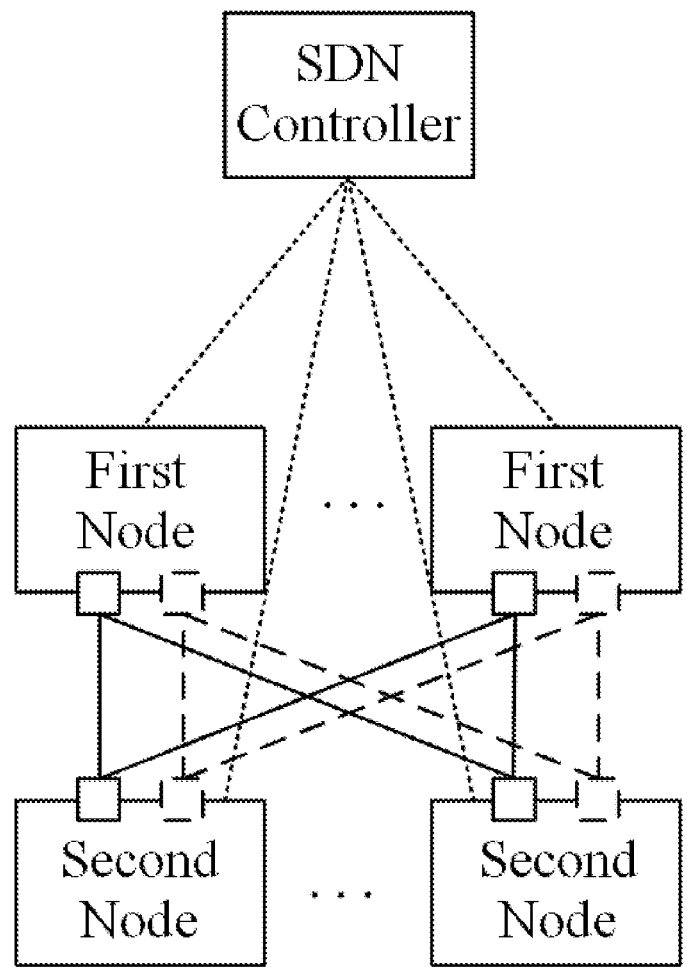
FIG. 2 is a schematic architecture diagram of a path selection system provided in the present disclosure.

Referring to FIG. 2 which is a schematic architecture diagram of a path selection system provided in the present disclosure, as shown in FIG. 2, the path selection system comprises first nodes and second nodes, and dedicated lines are deployed between the first nodes and the second nodes. In this example, multiple dedicated line interfaces (one dedicated line interface corresponds to one dedicated line, similarly hereinafter) are configured on a first node, multiple dedicated line interfaces are configured on a second node, the first node may form a point-to-multipoint connection with multiple second nodes via one or more dedicated line interfaces, and a second node may also form a point-to-multipoint connection with multiple first nodes via one or more dedicated line interfaces.

Each node (including the first nodes and the second nodes) in the path selection system is provided with an attribute of a dedicated line interface to the dedicated line, wherein the attribute of the dedicated line interface comprises one or more of a node to which the dedicated line interface pertains, and the dedicated line to which the dedicated line interface pertains. In the implementation mode, the SDN controller may obtain the attribute of a dedicated line interface to the dedicated line of a first node and of a second node, thereby determining dedicated line interfaces of the first node and the second node, and determining a connection status of the dedicated lines between the first node and the second node according to the dedicated line interfaces of the first node and the second node.

It is possible to perform, by the SDN controller, a selection of a traffic forwarding path between the first node and the second node and to perform a traffic scheduling according to the selected path.

Optionally, any two nodes may be selected as a source node and a destination node from the first nodes and the second nodes, and the SDN controller may select a traffic forwarding path from the paths between the source node and the destination node, and sends the traffic forwarding path to the source node so that the source node forwards traffic according to the traffic forwarding path.

The selection of the source node and the destination node may specifically comprise the following several situations:

a node is selected from the first nodes as a source node, and a node is selected from the second nodes as a destination node;

a node is selected from the second nodes as a source node, and a node is selected from the first nodes as a destination node;

a node is selected from the first nodes as a source node, and a node is selected from the first nodes as a destination node; and a node is selected from the second nodes as a source node, and a node is selected from the second nodes as a destination node.

Figure 3:
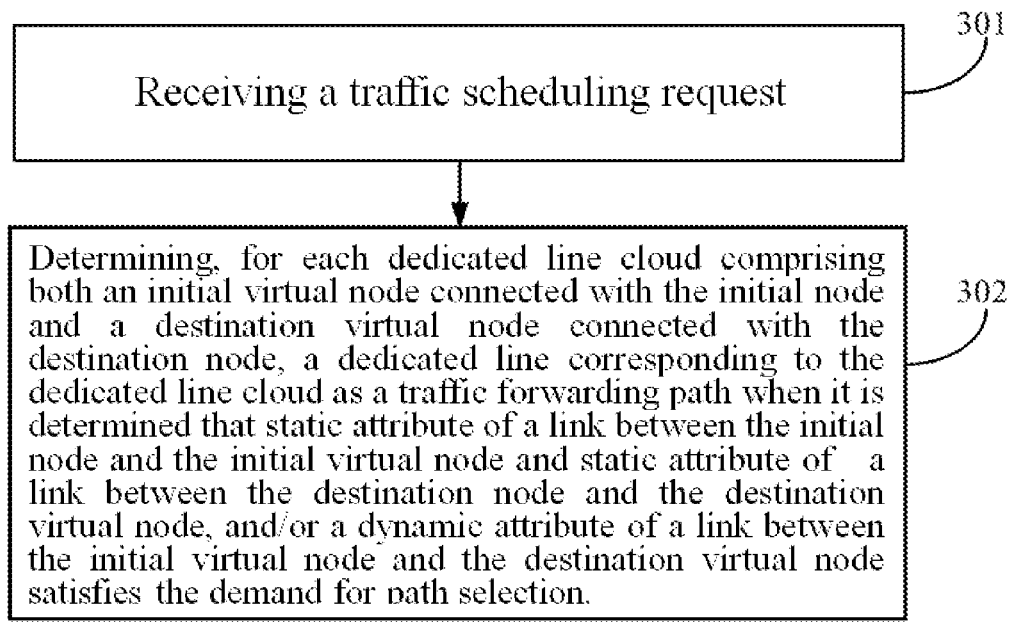
FIG. 3 is a schematic flowchart of a path selection method provided in the present disclosure.

Referring to FIG. 3 which is a schematic flowchart of a traffic scheduling method provided in the present disclosure, an execution subject thereof may be a controller in an SDN (i.e., an SDN controller). As shown in FIG. 3, the traffic scheduling method may comprise the following:

At Block 301, a traffic scheduling request is received.

In the present disclosure, a user may log in to a management interface of the SDN controller, and initiate a traffic scheduling request for any two nodes connected with a dedicated line according to a requirement, wherein the traffic scheduling request may comprise a requirement for path selection, a source node, and a destination node.

In the above, the requirement for path selection comprises a requirement for bandwidth and/or a requirement for quality. The requirement for bandwidth is used to determine whether a static attribute of each link on a path satisfies a preset requirement for bandwidth, and the requirement for quality is used to determine whether a dynamic attribute of each link on the path satisfies a preset requirement for quality. Optionally, the requirement for bandwidth may be that a minimum value of the remaining allocable bandwidth (allocable bandwidth subtracted by allocated bandwidth) of each link on the path is greater than or equal to the preset requirement for bandwidth for services. The requirement for quality may be that a superimposition of quality of each link on the path satisfies the preset requirement for quality for service, for example, if a packet loss rate required for services is less than 10%, then the product of pass rates of all the links on the path should be greater than 90%.

Correspondingly, when the SDN controller receives a traffic scheduling request, the SDN controller may obtain the source node and the destination node comprised in the traffic scheduling request, and determine topological information between the source node and the destination node according to topological information which is stored in the SDN controller, and then determine a traffic forwarding path according to the requirement for path selection comprised in the traffic scheduling request as well as the topological information between the source node and the destination node.

In the above, the topological information of the topology between the source node and the destination node, which is determined by the SDN controller, may comprise a connection relation between the source node and the destination node.

For instance, taking the node A and the node B in the point-to-multipoint model shown in FIG. 1 as an example, assuming that two dedicated lines (dedicated line a and dedicated line b) are deployed between the node A and the node B, the topological information of the topology between the node A and the node B, which is determined by the SDN controller, may comprise two different connections established between the node A and the node B via the dedicated line a and the dedicated line b.

Specifically, the SDN controller may obtain an attribute of a dedicated line interface to a dedicated line of the source node and of the destination node, wherein the attribute of the dedicated line interface comprises one or more of a node to which the dedicated line interface pertains, and the dedicated line to which the dedicated line interface pertains; and the SDN controller determines dedicated line interfaces of the source node and the destination node according to the attribute of the dedicated line interface, and determines a connection status of the dedicated line connected between the source node and the destination node according to the dedicated line interfaces of the source node and the destination node.

At Block 302, for each dedicated line cloud comprising both a source virtual node connected with the source node and a destination virtual node connected with the destination node, a dedicated line corresponding to the dedicated line cloud is determined as a traffic forwarding path when it is determined that: a static attribute of a link between the source node and the source virtual node in the dedicated line cloud and a static attribute of a link between the destination node and the destination virtual node in the dedicated line cloud satisfy the requirement of path selection, and/or when a dynamic attribute of a link between the source virtual node and the destination virtual node in the dedicated line cloud satisfies the requirement for path selection.

In the present disclosure, before receiving the traffic scheduling request, the SDN controller may create a corresponding dedicated line cloud for any dedicated line in the SDN; for a node connected with any dedicated line, the SDN controller may create a virtual node corresponding to the node in a dedicated line cloud corresponding to the dedicated line. In the above, the virtual node is a mapping node for the node in the dedicated line cloud.

Figure 4:
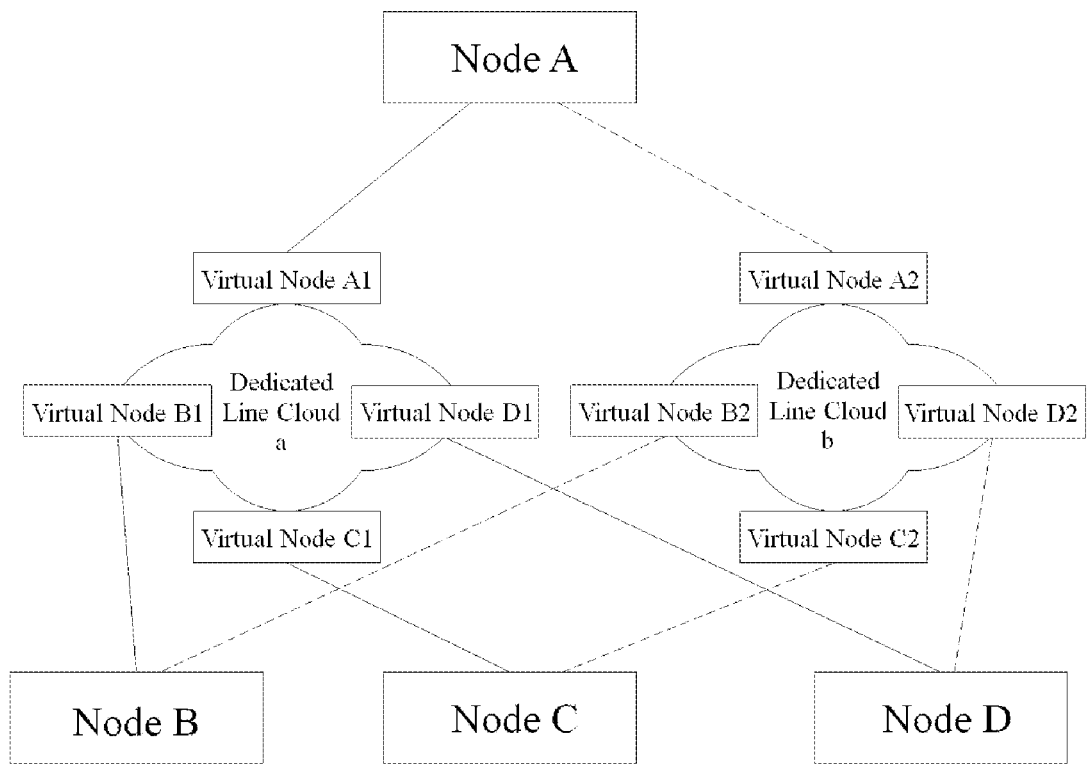
FIG. 4 is a schematic architecture diagram of an application scenario provided in the present disclosure.

For example, still taking the node A and the node B in the point-to-multipoint model shown in FIG. 1 as an example, with combined reference to FIG. 4, the SDN controller may respectively create dedicated line clouds (dedicated line cloud a and dedicated line cloud b) corresponding to the dedicated line a and the dedicated line b, and create a virtual node A1 corresponding to the node A and a virtual node B1 corresponding to the node B in the dedicated line cloud a, and create a virtual node A2 corresponding to the node A and a virtual node B2 corresponding to the node B in the dedicated line cloud b.

Correspondingly, in some examples of the present disclosure, a corresponding dedicated line cloud may be created for each of the dedicated lines between the aforesaid source node and the destination node, wherein the source node is capable of communicating with the destination node via one or more of the aforesaid dedicated lines. In the above, each dedicated line between the aforesaid source node and the destination node refers to a dedicated line connected with the source node and/or the destination node, that is, there are two cases: in the first case, it refers to each dedicated line connected with the source node or the destination node, and in the second case, it refers to each dedicated line connected with the source node and with the destination node.

Figure 5:
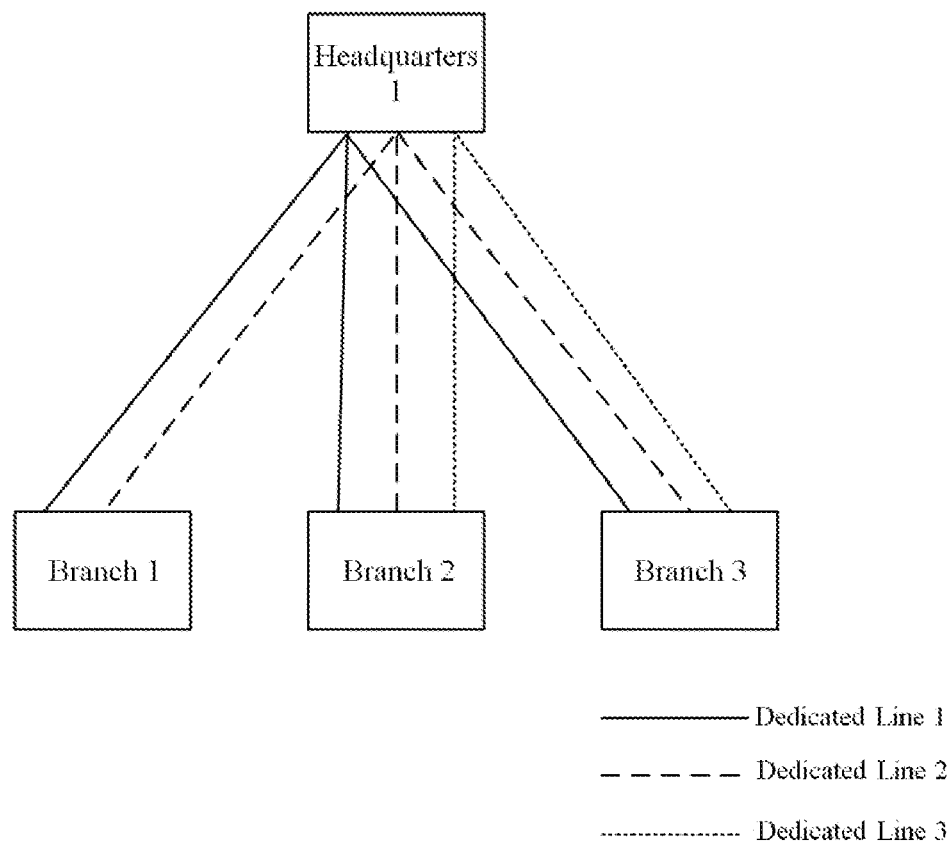
FIG. 5 is a schematic architecture diagram of a further application scenario provided in the present disclosure.

For example, taking an illustration in FIG. 5 as an example, it is assumed that headquarters 1 is a source node and branch 1 is a destination node. For the above-mentioned first case, the dedicated lines connected with the source node are dedicated line 1, dedicated line 2, and dedicated line 3, and the dedicated lines connected with the destination node are dedicated line 1 and dedicated line 2, then corresponding dedicated line cloud 1, dedicated line cloud 2, and dedicated line cloud 3 may be created; or dedicated line cloud 1 and dedicated line cloud 2 may be created. For the above-mentioned second case, the dedicated lines connected with the source node and with the destination node are dedicated line 1 and dedicated line 2, then corresponding dedicated line cloud 1 and dedicated line cloud 2 may be created.

The dedicated line cloud may be a logical node in a topological structure of an SDN, wherein the logical node may be created on a server, a virtual device, or a network device (e.g., a switch, a router, or the like), which is not limited in the present disclosure.

In some of the above-mentioned examples, for each dedicated line connected with the aforesaid source node and with the destination node (i.e., the dedicated lines described in the above-mentioned second case), a corresponding dedicated line cloud may be created, wherein the source node is capable of communicating with the destination node via one or more of the aforesaid dedicated lines.

In the present disclosure, a dedicated line cloud may be created in different manners. In an implementation mode, the aforesaid creation of a corresponding dedicated line cloud may comprise that:

the number of dedicated lines between the source node and the destination node is determined according to the obtained attribute of a dedicated line interface to the dedicated line; and a dedicated line cloud for each dedicated line between the source node and the destination node is created, wherein the attribute of the dedicated line interface comprises one or more of: a node corresponding to a dedicated line interface, a dedicated line to which the dedicated line interface pertains, and a dedicated line cloud to which the dedicated line interface pertains.

In the above, the attribute of the dedicated line interface may be configured on the SDN controller, or may also be configured on each node and reported by each node to the SDN controller. In other implementation modes, the attribute of the dedicated line interface may also be input by the user, and the SDN controller obtains the inputted attribute of the dedicated line interface.

It is should be noted that after any node accesses to a dedicated line cloud, the attribute of an dedicated line interface to the dedicated line of the node may comprise the dedicated line cloud to which a dedicated line interface in the node pertains.

In another implementation mode, the SDN controller receives a creation instruction from the user and creates a corresponding dedicated line cloud.

In the present disclosure, for the source node connected with any one of the dedicated lines, the SDN controller may create a source virtual node in a corresponding dedicated line cloud; and for the destination node connected with any one of the dedicated lines, the SDN controller may create a destination virtual node in a corresponding dedicated line cloud, wherein the source virtual node corresponds to the source node, and the destination virtual node corresponds to the destination node.

It should be noted that, in the present disclosure, after the SDN controller creates a virtual node in the dedicated line cloud, the SDN controller may also record node information of the virtual node, wherein the node information includes, but is not limited to, a dedicated line cloud to which the virtual node pertains, a node corresponding to the virtual node, information on an external connection port of the virtual node, and information on an internal connection port of the virtual node. In the above, the external connection port refers to an interface in the virtual node that is configured to be connected with the corresponding node, and the internal connection port is an interface in the virtual node that is configured to be connected with other virtual nodes.

For example, still taking the above-mentioned illustration of FIG. 4 as an example, after the SDN controller creates a virtual node A1 corresponding to the node A in the dedicated line cloud a, the SDN controller may record node information of the virtual node A1. The node information comprises, but is not limited to, the dedicated line cloud (i.e., the dedicated line cloud a) to which the virtual node A1 pertains, the corresponding node (i.e., the node A), information on an external connection port (i.e., an interface of the virtual node A1 that is connected with the node A), and information on an internal connection port (i.e., an interface of the virtual node A1 that is connected with other virtual nodes (such as virtual node B1, virtual node C1, and virtual node D1) in the dedicated line cloud).

In one example of the present disclosure, the SDN controller may create a virtual node corresponding to a node in the dedicated line cloud, when it is detected that the node connects to the dedicated line cloud.

For example, taking the above-mentioned illustration of FIG. 1 as an example, the SDN controller may create a virtual node (i.e., virtual node A1) corresponding to the node A when the node A accesses to the dedicated line cloud 1, and create a virtual node (i.e., virtual node B1) corresponding to the node B when the node B accesses to the dedicated line cloud 1.

Correspondingly, the aforesaid creation of a source virtual node and a destination virtual node in a corresponding dedicated line cloud may comprise that:

when it is detected that a source node connected with any dedicated line connects to a dedicated line cloud corresponding to the dedicated line, a source virtual node corresponding to the source node in the dedicated line cloud is created; and when it is detected that the destination node connected with any dedicated line connects to a dedicated line cloud corresponding to the dedicated line, a destination virtual node corresponding to the destination node in the dedicated line cloud is created.

In the above, after the SDN controller creates a virtual node corresponding to each node, the SDN controller may also connect the node to the corresponding virtual node. Taking FIG. 4 as an example, after the virtual node A1 corresponding to the node A is created, the node A is connected with the virtual node A1; and after the virtual node B1 corresponding to the node B is created, the node B is connected with the virtual node B1. In the above, a link between the node and the corresponding virtual node may be referred to as an "inter-cloud link" or "inter-cloud connection". For example, a link between the node A and the virtual node A1, a link between the node A and the virtual node A2, a link between the node B and the virtual node B1, or the like may be referred to as an inter-cloud link or an inter-cloud connection.

In detail, in the present disclosure, for a source node connected with any one of the dedicated lines, after a source virtual node is created in the corresponding dedicated line cloud, a source dedicated line interface of the source node may be connected to the created source virtual node to form an inter-cloud link, wherein the source dedicated line interface is a dedicated line interface in the source node that is connected with the dedicated line. For a destination node connected with any one of the dedicated lines, after a destination virtual node is created in the corresponding dedicated line cloud, a destination dedicated line interface of the destination node may be connected with the created destination virtual node to form an inter-cloud link, wherein the destination dedicated line interface is a dedicated line interface in the destination node that is connected with the dedicated line.

For example, after the virtual node A1 corresponding to the node A is created, a dedicated line interface on the node A is connected to the virtual node A1, which dedicated line interface on the node A is connected with the dedicated line 1, thereby forming an inter-cloud link A-A1 connecting the node A and the virtual node A1; after the virtual node B1 corresponding to the node B is created, a dedicated line interface on the node B is connected to the virtual node B1, which dedicated line interface on the node B is connected with the dedicated line 1, thereby forming an inter-cloud link B-B1 connecting the node B and the virtual node B1. Similarly, the node B is connected with the virtual node B2 to form an inter-cloud link B-B2, the node C is connected with the virtual node C1 to form an inter-cloud link C-C1, the node C is connected with the virtual node C2 to form an inter-cloud link C-C2, the node D is connected with the virtual node D1 to form an inter-cloud link D-D1, and the node D is connected with the virtual node D2 to form an inter-cloud link D-D2.

In the present disclosure, a dedicated line interface on the source node that is connected with any dedicated line is a source dedicated line interface, and a dedicated line interface on the destination node that is connected with any dedicated line is a destination dedicated line interface.

In the present disclosure, after the SDN controller creates a virtual node corresponding to a node and connects the node with the corresponding virtual node, for each dedicated line cloud comprising both a source virtual node connected with the source node and a destination virtual node connected with the destination node, the SDN controller can determine whether a static attribute of a link between the source node and the source virtual node in the dedicated line cloud and a static attribute of a link between the destination node and the destination virtual node in the dedicated line cloud satisfy the requirement for path selection. A dedicated line corresponding to the dedicated line cloud is determined as a traffic forwarding path when both of the static attributes satisfy the requirement.

In the present disclosure, the SDN controller can also connect source virtual nodes and destination virtual nodes which are located in a same dedicated line cloud, for each dedicated line cloud comprising both a source virtual node connected to the source node and a destination virtual node connected to the destination node, the SDN controller may also determine whether dynamic attributes of the link between the source node and the source virtual node and the link between the destination node and the destination virtual node satisfy the requirement for path selection.

In the practical application, there may be a case where some dedicated line clouds comprise a source virtual node, some dedicated line clouds comprise a destination virtual node, and some dedicated line clouds comprise both a source virtual node and a destination virtual node. When a certain dedicated line cloud (such as the dedicated line cloud a) comprises both the source virtual node A1 and the destination virtual node B1, the source virtual node A1 and the destination virtual node B1 may be considered to be located in the same dedicated line cloud a. In the present disclosure, for a dedicated line cloud comprising both a source virtual node and a destination virtual node, the SDN controller may connect the source virtual node and the destination virtual node in the dedicated line cloud, thereby realizing the connection between the source virtual node and the destination virtual node which are located in a same dedicated line cloud.

Specifically, after receiving a traffic scheduling request, the SDN controller may query node information of the virtual nodes recorded in the SDN controller itself to determine the node information of the source virtual node corresponding to the source node and the node information of the destination virtual node corresponding to the destination node. Then the SDN controller may determine a dedicated line cloud comprising the source virtual node and a dedicated line cloud comprising the destination virtual node, thereby determining a dedicated line cloud comprising both the source virtual node and the destination virtual node, thereby the SDN controller may connect the source virtual node and the destination virtual node which are located in the same dedicated line cloud via an internal connection port of the source virtual node and an internal connection port of the destination virtual node. In the above, a link between virtual nodes may be referred to as an "intra-cloud link" or "intra-cloud connection". It can be understood that, in the dedicated line cloud comprising both the source virtual node and the destination virtual node, the link connecting the source virtual node and the destination virtual node forms an intra-cloud link.

For example, as shown in FIG. 4, when the source node in the traffic scheduling request is node A and the destination node is node B, the SDN controller may determine, according to the node information of the node A, that the source virtual nodes corresponding to the node A are: virtual node A1 and virtual node A2. Then, it is determined that dedicated line cloud a comprises the virtual node A1, and dedicated line cloud b comprises the virtual node A2, that is, the dedicated line clouds comprising the source virtual nodes corresponding to the node A are: the dedicated line cloud a and the dedicated line cloud b. Thereafter, it may be determined that destination virtual nodes corresponding to the node B are virtual node B1 and virtual node B2 according to the node information of the node B, and thereby it is determined that the dedicated line cloud a comprises the virtual node B1, and the dedicated line cloud b comprises the virtual node B2, that is, the dedicated line clouds comprising the destination virtual nodes corresponding to the node B are: the dedicated line cloud a and the dedicated line cloud b.

In this way, the SDN controller may determine that the dedicated line clouds comprising both the source virtual node corresponding to the source node (the node A) and the destination virtual node corresponding to the destination node (the node B) are the dedicated line cloud a and the dedicated line cloud b. Thus, in the dedicated line cloud a, the source virtual node (the virtual node A1) and the destination virtual node (the virtual node B1) are connected, and a link between the virtual node A1 and the virtual node B1 is an intra-cloud link; in the dedicated line cloud b, the source virtual node (the virtual node A2) and the destination virtual node (the virtual node B2) are connected, and a link between the virtual node A2 and the virtual node B2 is an intra-cloud link.

In the present disclosure, after connecting the source virtual node and the destination virtual node which are located in the same dedicated line cloud, the SDN controller may determine a traffic forwarding path according to the requirement for path selection comprised in the traffic scheduling request, and a static attribute of a link between the source node and the source virtual node and a static attribute of a link between the destination node and the destination virtual node, and/or a dynamic attribute of a link between the source virtual node and the destination virtual node in each dedicated line cloud comprising both the source virtual node connected with the source node and the destination virtual node connected with the destination node.

In the above, in one case, if the requirement for path selection comprises the requirement for bandwidth, for each dedicated line cloud comprising both the source virtual node connected with the source node and the destination virtual node connected with the destination node, when the SDN controller determines that both the static attribute of the link between the source node and the source virtual node, and the static attribute of the link between the destination node and the destination virtual node satisfy the requirement for path selection, a dedicated line corresponding to the dedicated line cloud is determined as a traffic forwarding path.

It is found by research that in the related art, in a point-to-multipoint network, it is difficult to perform path selection according to bandwidth. For example, in the scenario as shown in FIG. 1, the dedicated line 1 carries three links located respectively between the node A and the node B, between the node A and the node C, and between the node A and the node D; and the three links are all accessed to the same dedicated line interface of the node A. In practical application, it is possible to configure an overall static attribute of the links corresponding to a certain dedicated line interface, i.e., the bandwidth shared by the above-mentioned three links, while it could be impossible to set the static attribute of one of the above-mentioned three links. Thus, during the process of path selection according to bandwidth, it could be impossible to determine the size of the allocable bandwidth of each link on the dedicated line 1, and thus it could be impossible to perform path selection according to bandwidth.

In contrast, with the path selection method provided in the present disclosure, the above-mentioned three links are converted into an inter-cloud link A-A1 connecting a dedicated line interface of the node A with the virtual node A1 in the dedicated line cloud a, an inter-cloud link B-B1 connecting a dedicated line interface of the node B with the virtual node B1 in the dedicated line cloud a, an inter-cloud link C-C1 connecting a dedicated line interface of the node C with the virtual node C1 in the dedicated line cloud a, and an inter-cloud link D-D1 connecting a dedicated line interface of the node D with the virtual node D1 in the dedicated line cloud a. In this way, any dedicated line interface on any node may be connected with an inter-cloud link, and the static attribute of an inter-cloud link corresponding to each of the dedicated line interfaces can be set conventionally, thereby a path selection based on bandwidth in the point-to-multipoint network is realized. In other words, with the path selection method provided in the present disclosure, in each point-to-multipoint model, for multiple dedicated lines involved in the model, a node connected with each dedicated line is provided with a virtual node in a dedicated line cloud corresponding to the dedicated line, thereby the point-to-multipoint model is divided into multiple point-to-point models, hence a path selection based on bandwidth can be realized by this solution.

In another case, if the requirement for path selection comprises the requirement for quality, for each dedicated line cloud comprising both the source virtual node connected with the source node and the destination virtual node connected with the destination node, when the SDN controller determines that the dynamic attribute of the link between the source virtual node and the destination virtual node satisfies the requirement for path selection, a dedicated line corresponding to the dedicated line cloud is determined as a traffic forwarding path.

In another case, if the requirement for path selection comprises the requirement for bandwidth and the requirement for quality, for each dedicated line cloud comprising both the source virtual node connected with the source node and the destination virtual node connected with the destination node, a dedicated line corresponding to the dedicated line cloud is determined as a traffic forwarding path when the SDN controller determines that: the static attribute of the link between the source node and the source virtual node, and the static attribute of the link between the destination node and the destination virtual node, and the dynamic attribute of the link between the source virtual node and the destination virtual node satisfy the requirement for path selection.

It can be seen that, in the process of the method shown in FIG. 3, a dedicated line cloud is created corresponding to each dedicated line, and a virtual node corresponding to each node is created in the dedicated line cloud, the static attribute of a link is carried on the link between a node and the virtual node corresponding to the node, and the dynamic attribute of a link is carried on the link between two virtual nodes in the cloud, when a traffic scheduling request is received, a traffic forwarding path is determined according to the requirement for path selection comprised in the traffic scheduling request, and the static attribute of the link between the source node and the source virtual node and the static attribute of the link between the destination node and the destination virtual node, and/or the dynamic attribute of the link between the source virtual node and the destination virtual node, thereby a path selection based on bandwidth and quality in a point-to-multipoint network is realized by the SDN controller.

In the above, a static attribute of a link corresponding to a dedicated line interface may be set on an inter-cloud link connected with the dedicated line interface so that the static attribute is carried on the inter-cloud link; and a dynamic attribute of the link corresponding to the dedicated line interface may be set on an intra-cloud link so that the dynamic attribute is carried on the intra-cloud link.

In a further example of the present disclosure, the aforesaid static attribute of the link between the source node and the source virtual node is determined in the following manner:

the allocable bandwidth of a dedicated line corresponding to a dedicated line cloud comprising the source virtual node is determined as the static attribute of the link between the source node and the source virtual node.

The aforesaid static attribute of the link between the destination node and the destination virtual node is determined in the following manner:

the allocable bandwidth of a dedicated line corresponding to a dedicated line cloud comprising the destination virtual node is determined as the static attribute of the link between the destination node and the destination virtual node.

In this example, for a link between the source node and any source virtual node, the SDN controller may determine the allocable bandwidth of a dedicated line corresponding to a dedicated line cloud comprising the source virtual node as the static attribute of the link between the source node and the source virtual node.

Similarly, for a link between the destination node and any destination virtual node, the SDN controller may determine the allocable bandwidth of a dedicated line corresponding to a dedicated line cloud comprising the destination virtual node as the static attribute of the link between the destination node and the destination virtual node.

Still taking the above-mentioned illustration of FIG. 4 as an example, for a link between the node A and the virtual node A1, the SDN controller may determine the allocable bandwidth of a dedicated line (i.e., the dedicated line a) corresponding to the dedicated line cloud (i.e., the dedicated line cloud a) comprising the virtual node A1 as the static attribute of the link between the node A and the virtual node A1, that is, the SDN controller determines the allocable bandwidth of the dedicated line a as the static attribute of the link between the node A and the virtual node A1.

In the related art, generally quality information (i.e., dynamic attribute) of a link is obtained by an NQA (Network Quality Analyzer) technology, that is, an NQA instruction is sent to the physical devices at both ends of a link to obtain the quality information of the link. However, in general, the NQA technology is only supported by physical devices, whereas each end of an intra-cloud link in the present disclosure is connected with a virtual node, in this case, quality information of the intra-cloud link shown in the example of the present disclosure cannot be directly obtained. Therefore, for a certain intra-cloud link, quality information of a link between the involved physical devices may be considered as the quality information (i.e., dynamic attribute) of the intra-cloud link, wherein the involved physical devices are real nodes corresponding to the virtual nodes at both ends of the intra-cloud link. For example, for the intra-cloud link A1-B1 connecting the virtual node A1 and the virtual node B1, quality information of a link between the node A corresponding to the virtual node A1 and the node B corresponding to the virtual node B1 may be used as the quality information (i.e., dynamic attribute) of the intra-cloud link A1-B1.

Correspondingly, in one example of the present disclosure, the aforesaid dynamic attribute of the link (i.e., the intra-cloud link) between the source virtual node and the destination virtual node is determined in the following manner:

an NQA (Network Quality Analyzer) instruction is sent respectively to a source dedicated line interface of a dedicated line corresponding to a dedicated line cloud comprising the source virtual node, and to a destination dedicated line interface of a dedicated line corresponding to a dedicated line cloud comprising the destination virtual node, and the obtained quality information between the source dedicated line interface and the destination dedicated line interface is determined as the dynamic attribute of the link between the source virtual node and the destination virtual node. In the above, the source dedicated line interface is a dedicated line interface in the source node, and the source dedicated line interface is connected with the dedicated line; and the destination dedicated line interface is a dedicated line interface in the destination node, and the destination dedicated line interface is connected with the dedicated line.

In this example, for any dedicated line cloud comprising both a source virtual node and a destination virtual node, when it is necessary to determine a dynamic attribute of a link between the source virtual node and the destination virtual node in the dedicated line cloud, the SDN controller may respectively send an NQA (Network Quality Analyzer) instruction to a source dedicated line interface on the source node that the source dedicated line interface is connected with a dedicated line corresponding to the dedicated line cloud, and to a destination dedicated line interface on the destination node that the destination dedicated line interface is connected with a dedicated line corresponding to the dedicated line cloud, so as to obtain a quality information between the source dedicated line interface and the destination dedicated line interface, and the SDN controller may determine the quality information as the dynamic attribute of the link between the source virtual node and the destination virtual node in the dedicated line cloud. It can be known that, for each dedicated line cloud comprising both a source virtual node and a destination virtual node, quality information between the source dedicated line interface and the destination dedicated line interface is the dynamic attribute of the link between the source node and the destination node which are connected with the dedicated line corresponding to the dedicated line cloud.

Still taking the above-mentioned illustration of FIG. 4 as an example, when the SDN controller needs to determine the dynamic attribute of the link between the virtual node A1 and the virtual node B1, the SDN controller may respectively send an NQA instruction to a dedicated line interface on the node A, which interface is connected with the dedicated line a, and to a dedicated line interface on the node B, which interface is connected with the dedicated line a, so as to obtain a quality information between the dedicated line interface on the node A connected with the dedicated line a and the dedicated line interface on the node B connected with the dedicated line a, and the SDN controller may determine the quality information as the dynamic attribute of the link between the virtual node A1 and the virtual node B1, i.e., the dynamic attribute of the link between the source node and the destination node which are connected with the dedicated line a corresponding to the dedicated line cloud a.

In one example of the present disclosure, the dynamic attribute of the link between the source node and the source virtual node, and the link between the destination node and the destination virtual node are optimal, for example, a delay of the link between the source node and the source virtual node and the link between the destination node and the destination virtual node is 0; a packet loss rate of the link between the source node and the source virtual node and the link between the destination node and the destination virtual node is 0; a jitter of the link between the source node and the source virtual node and the link between the destination node and the destination virtual node is 0.

In one example of the present disclosure, in any dedicated line cloud, the link between the source virtual node and the destination virtual node is provided with an optimal static attribute, for example, in any dedicated line cloud, the link between the source virtual node and the destination virtual node is provided with an infinite allocable bandwidth and an cost of 0.

In one example of the present disclosure, after the SDN controller determines a traffic forwarding path, it is also necessary to send the traffic forwarding path to the source node, so that the source node can perform traffic forwarding according to the traffic forwarding path. The SDN controller may send the traffic forwarding path by means of, but not limited to the following modes: sending a flow table by openflow, sending the traffic forwarding path by global PBR (Policy-based Routing) or PBR, or sending the traffic forwarding path to the source node by a path label stack of Segment Routing (SR).

In order to enable those skilled in the art to better understand the technical solutions provided in the present disclosure, the technical solutions provided in the present disclosure will be described below in connection with specific application scenarios.

Referring to FIG. 5 which is a schematic architecture diagram of a point-to-multipoint model in an example provided in the present disclosure, as shown in FIG. 5, an enterprise implements data interaction between a headquarters 1 and branches 1-3 by renting a dedicated line provided by an ISP (Internet Service Provider). Several physical interfaces of the headquarters 1 are respectively connected to respective dedicated lines (assuming that dedicated lines 1-3 are comprised), and each of the branches 1-3 is also provided with several physical interfaces respectively connected to the respective dedicated lines. In the above, the headquarters 1 may be the first node shown in FIG. 2, the branches 1-3 may be the second nodes shown in FIG. 2, and the headquarters 1 and the branches 1-3 may communicate with the SDN controller (which is not depicted in FIG. 5, and reference may be made to the illustration in FIG. 2 for details). A dedicated line interface may be a physical interface on the headquarters or on each of the branches, which dedicated line interface is connected with any dedicated line.

Based on the scenario shown in FIG. 5, the process of implementation of the path selection method provided in the present disclosure will be described in detail below with reference to FIG. 6A to FIG. 6C.

1. A corresponding dedicated line cloud is created for any dedicated line via which the headquarters is connected with the branches, wherein the dedicated line 1 corresponds to the dedicated line cloud 1, the dedicated line 2 corresponds to the dedicated line cloud 2, and the dedicated line 3 corresponds to the dedicated line cloud 3.

In the implementation, a corresponding dedicated line cloud may be created in advance for each dedicated line, or the dedicated line cloud may also be created by an SDN controller according to a traffic scheduling request when it receives the traffic scheduling request. For example, the traffic scheduling request received by the SDN controller is initiated for the headquarters 1 and the branch 2, that is, the source node is the headquarters 1 and the destination node is the branch 2, then the SDN controller may determine that the dedicated lines between the headquarters 1 and the branch 2 comprise the dedicated line 1, the dedicated line 2, and the dedicated line 3, according to node information of the headquarters 1 and node information of the branch 2, and may respectively create a dedicated line cloud corresponding to the dedicated line 1, the dedicated line 2, and the dedicated line 3.

It should be understood that if there is already a dedicated line cloud corresponding to any dedicated line via which the headquarters is connected with a branch, it is unnecessary to create the dedicated line cloud again.

2. After the dedicated line cloud is created, a node connected with a dedicated line is connected to the dedicated line cloud, which dedicated line corresponds to the dedicated line cloud. For example, after the dedicated line cloud 1 is created, the headquarters 1 and the branches 1-3 each is connected to the dedicated line cloud 1. Thereafter, if there is a new node connected with the dedicated line 1, the new node will be connected to the dedicated line cloud 1. Specifically, a virtual node corresponding to a node may be created in the dedicated line cloud, and then the node is connected with the corresponding virtual node, so as to realize connecting the node to the dedicated line cloud.

In a specific implementation, when the SDN controller detects that the headquarters connected with any dedicated line connects to a dedicated line cloud corresponding to the dedicated line, the SDN controller creates a virtual node corresponding to the headquarters in the dedicated line cloud to which the headquarters is connected, and records node information of the virtual node.

When the SDN controller detects that the branch connected with any dedicated line connects to a dedicated line cloud corresponding to the dedicated line, the SDN controller creates a virtual node corresponding to the branch in the dedicated line cloud to which the branch is connected, and records node information of the virtual node.

Figure 6A:
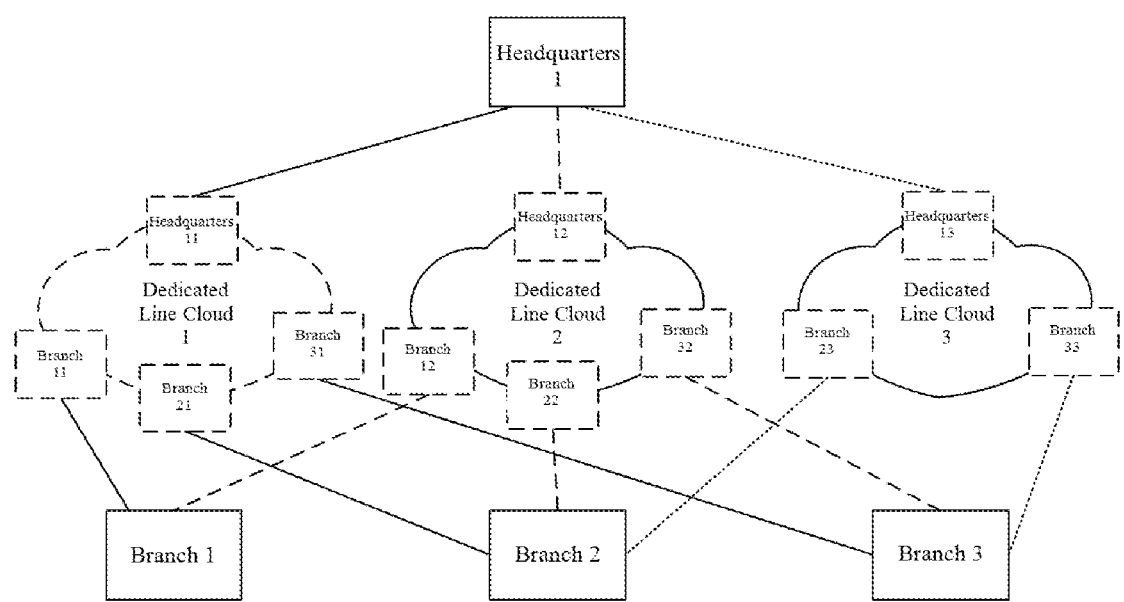
FIG. 6A is a schematic diagram of a virtual link model corresponding to the application scenario shown in FIG. 5.

Then the SDN controller connects the headquarters with the corresponding virtual node thereof and connects the branch with the corresponding virtual node thereof, a schematic architecture diagram after the dedicated line cloud and the virtual nodes are created based on the scenario shown in FIG. 5 is as shown in FIG. 6A. It is assumed that a virtual node corresponding to the headquarters 1 in the dedicated line cloud 1 is referred to as headquarters 11, and virtual nodes in the dedicated line cloud 1 corresponding to the branches 1-3 are respectively referred to as branches 11-31; a virtual node corresponding to the headquarters 1 in the dedicated line cloud 2 is referred to as headquarters 12, and virtual nodes in the dedicated line cloud 2 corresponding to the branches 1-3 are respectively referred to as branches 12-32; a virtual node corresponding to the headquarters 1 in the dedicated line cloud 3 is referred to as headquarters 13, and virtual nodes in the dedicated line cloud 3 corresponding to the branches 2-3 are respectively referred to as branches 23-33. In other words, headquarters ij represents a virtual node of headquarters i in dedicated line cloud j, and branch ij represents a virtual node branch i in the dedicated line cloud j.

In the above, node information of a virtual node comprises, but is not limited to, a dedicated line cloud to which the virtual node pertains, a real node to which each of the virtual nodes corresponds (e.g., the headquarters 1 and the branches 1-3), an external connection port (an interface on each of the virtual nodes that is connected with a dedicated line interface of the respective real node), and an internal connection port (an interface of the virtual node that is connected with other virtual nodes in the dedicated line cloud to which the virtual node pertains).

For example, in FIG. 6A, node information on the branch 11 which is a virtual node may comprise a dedicated line cloud to which the branch 11 pertains (i.e., dedicated line cloud 1), a real node to which the branch 11 corresponds (i.e., branch 1), an external connection port of the branch 11 (an interface configured to be connected with a dedicated line interface of the branch 1), and an internal connection port of the branch 11 (an interface configured to be connected with an internal connection port of the headquarters 11 in the dedicated line cloud 1).

Based on FIG. 6A, the SDN controller may respectively connect the headquarters with the corresponding virtual node in each dedicated line cloud, and connect each branch with the corresponding virtual node in each dedicated line cloud. Taking the headquarters 1 as an example, the SDN controller may connect a dedicated line interface on the headquarters 1, which corresponds to the dedicated line 1, with the headquarters 11 in the dedicated line cloud 1; connect a dedicated line interface on the headquarters 1, which corresponds to the dedicated line 2, with the headquarters 12 in the dedicated line cloud 2; and connect a dedicated line interface on the headquarters 1, which corresponds to the dedicated line 3, with the headquarters 13 in the dedicated line cloud 3.

Figure 6B:
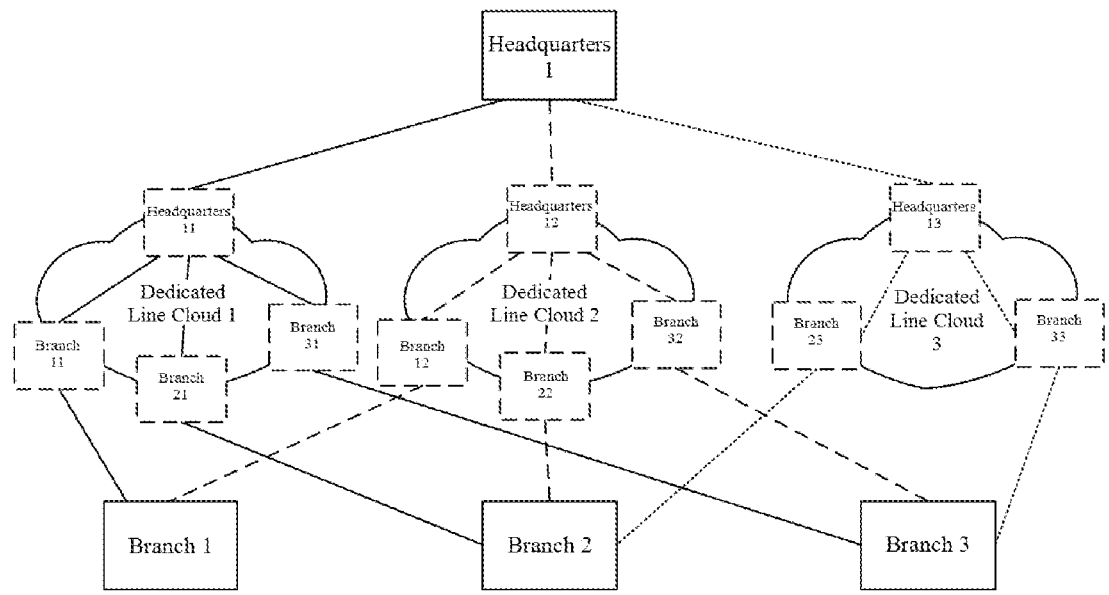
FIG. 6B is a schematic diagram of another virtual link model corresponding to the application scenario shown in FIG. 5.

A point-to-multipoint connection from the headquarters 1 to the branches 1-3 in FIG. 5 may be mapped into the respective dedicated line clouds by the above-mentioned process, and a schematic diagram thereof may be as shown in FIG. 6B.

In the above, the link between each node (including the headquarters or the branches) and the corresponding virtual nodes (hereinafter referred to as the inter-cloud link) is provided with an optimal dynamic attribute, that is, the connection has a delay of 0, a packet loss rate of 0, and a jitter of 0.

3. Based on the architecture diagram shown in FIG. 6B, it is not only possible to determine whether the static attribute of each link on the path satisfies the requirement for bandwidth comprised in the requirement for path selection, but also possible to determine whether the dynamic attribute of each link on the path satisfies the requirement for quality comprised in the requirement for path selection. Based on the architecture diagram shown in FIG. 6A, it is possible to determine whether the static attribute of each link on the path satisfies the requirement for bandwidth comprised in the requirement for path selection. If it is necessary to determine whether the dynamic attribute of each link on the path satisfies the requirement for quality comprised in the requirement for path selection, it is necessary to connect the source virtual node and the destination virtual nodes in the same dedicated line cloud in FIG. 6A. The process of implementation of path selection will be described below in detail by taking the architecture shown in FIG. 6A as an example.

When a request for traffic scheduling from the headquarters 1 to the branch 2 is received (that is, the source node is the headquarters 1 and the destination node is the branch 2), a virtual node corresponding to the headquarters 1 and a virtual node corresponding to the branch 2 in the same dedicated line cloud are connected.

Figure 6C:
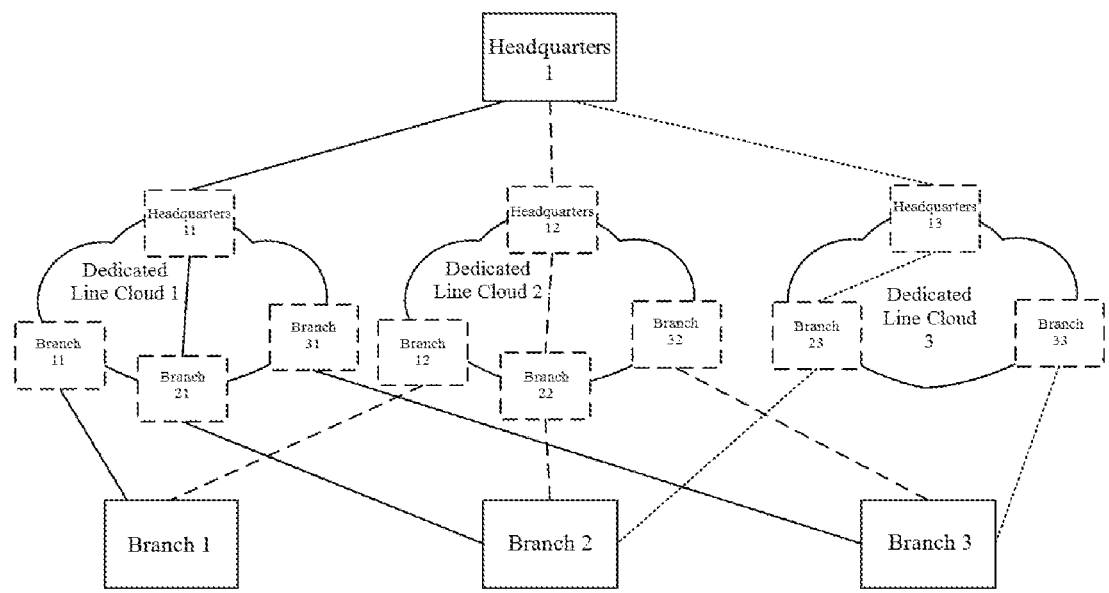
FIG. 6C is a schematic diagram of still another virtual link model corresponding to the application scenario shown in FIG. 5.

In the above, for the dedicated line cloud 1, the headquarters 11 is connected to the branch 21; for the dedicated line cloud 2, the headquarters 12 is connected to the branch 22; for the dedicated line cloud 3, the headquarters 13 is connected to the branch 23, and a schematic diagram thereof may be as shown in FIG. 6C.

In the above, the connection between the virtual node corresponding to the headquarters and the virtual nodes corresponding to the branches in the same dedicated line cloud (hereinafter referred to as the intra-cloud connection) is provided with an optimal static attribute, that is, the connection is provided with infinite bandwidth and a cost of 0.

4. For each dedicated line cloud comprising a virtual node connected with the headquarters 1 and a virtual node connected with the branch 2, a dedicated line corresponding to the dedicated line cloud is determined as a traffic forwarding path when it is determined that the following satisfies the requirement for path selection: the static attribute of a link between the headquarters 1 and the virtual node corresponding to the headquarters 1 in the dedicated line cloud and the static attribute of a link between the branch 2 and the virtual node corresponding to the branch 2 in the dedicated line cloud, and/or the dynamic attribute of a link between the virtual node corresponding to the headquarters 1 in the dedicated line cloud and the virtual node corresponding to the branch 2 in the dedicated line cloud.

Taking a case where the requirement for path selection comprises the requirement for bandwidth as an example, assuming that for the dedicated line 1, the dedicated line output bandwidth of the headquarters 1 (i.e. the uplink bandwidth of the dedicated line 1) is configured to be 500 Mbps, that is, the allocable bandwidth of the link from the headquarters 1 to the headquarters 11 is configured to be 500 Mbps; for the dedicated line 2, the dedicated line output bandwidth of the headquarters 1 (i.e. the uplink bandwidth of the dedicated line 2) is configured to be 1 Gbps, that is, the allocable bandwidth of the link from the headquarters 1 to the headquarters 12 is configured to be 1 Gbps; for the dedicated line 3, the dedicated line output bandwidth of the headquarters 1 (i.e. the uplink bandwidth of the dedicated line 3) is configured to be 200 Mbps, that is, the allocable bandwidth of the link from the headquarters 1 to the headquarters 13 is configured to be 200 Mbps, and the dedicated line input bandwidth of each branch (i.e. the downlink bandwidth of each dedicated line) is configured to be sufficiently large (for example, each being greater than 1 Gbps). When it is necessary to select a path from the headquarters 1 to the branch 2A, path that can be selected may comprise "headquarters 1—headquarters 11—branch 21—branch 2", "headquarters 1—headquarters 12—branch 22—branch 2", and "headquarters 1—headquarters 13—branch 23—branch 2".

Since the bandwidth of the intra-cloud connection is infinite, and dedicated line input bandwidth of each branch is sufficiently large, when selecting path based on bandwidth, it is only necessary to consider the allocable bandwidth of the link which connected the headquarters 1 to the virtual node corresponding to the headquarters in the target dedicated line cloud. The "target dedicated line cloud" here refers to a dedicated line cloud comprising both a virtual node corresponding to the headquarters 1 and a virtual node corresponding to the branch 2, for example, the dedicated line clouds may include the dedicated line cloud 1 (comprising the headquarters 11 and the branch 21), the dedicated line cloud 2 (comprising the headquarters 12 and the branch 22), and the dedicated line cloud 3 (comprising the headquarters 13 and the branch 23) shown in FIG. 6A to FIG. 6C. So, it is only necessary to take into consideration the allocable bandwidth of the links of "headquarters 1—headquarters 11", "headquarters 1—headquarters 12", and "headquarters 1—headquarters 13", which is provided with an value of 500 Mbps, 1 Gbps, and 200 Mbps, respectively.

When the preset requirement for bandwidth which is set based on the requirement for bandwidth is that the traffic transmission rate does not exceed 200 Mbps, the SDN controller may select any dedicated line as the traffic forwarding path; when the preset requirement for bandwidth which is set based on requirement for bandwidth is that the traffic transmission rate exceeds 200 Mbps and does not exceed 500 Mbps, the SDN controller may select the dedicated line 1 or dedicated line 2 as the traffic forwarding path; and when the preset requirement for bandwidth set based on requirement for bandwidth is that the traffic transmission rate exceeds 500 Mbps and does not exceed 1 Gbps, the SDN controller may select the dedicated line 1 as the traffic forwarding path.

It is worth noting here that in the above-mentioned example, when the dedicated line input bandwidth of each branch is not sufficiently large, when selecting path based on bandwidth, it is necessary to judge whether the allocable bandwidth of the link from the headquarters 1 to the virtual node corresponding to the headquarters 1 in each target dedicated line cloud satisfies the requirement for bandwidth, and determine the allocable bandwidth of the link from the branch 1 to the virtual node corresponding to the branch 1 in each target dedicated line cloud.

It is now assumed that, for the dedicated line 1, the dedicated line input bandwidth of the branch 2 (i.e. the downlink bandwidth of the dedicated line 1) is configured to be 500 Mbps, that is, the allocable bandwidth of the link connected the branch 21 and the branch 2 is 500 Mbps; for the dedicated line 2, the dedicated line input bandwidth of the branch 2 (i.e. the downlink bandwidth of the dedicated line 1) is configured to be 1 Gbps, that is, the allocable bandwidth of the link connected the branch 22 and the branch 2 is 1 Gbps; and for the dedicated line 3, the dedicated line input bandwidth of the branch 2 (i.e. the downlink bandwidth of the dedicated line 1) is configured to be 200 Mbps, that is, the allocable bandwidth of the link connected the branch 23 and the branch 2 is 200 Mbps. In this case, if the preset requirement for bandwidth for traffic from the headquarters 1 to the branch 2 is that the traffic transmission rate is greater than or equal to 200 Mbps and does not exceed 500 Mbps, the dedicated line 1 or the dedicated line 2 may be selected as the traffic forwarding path.

Figure 7:
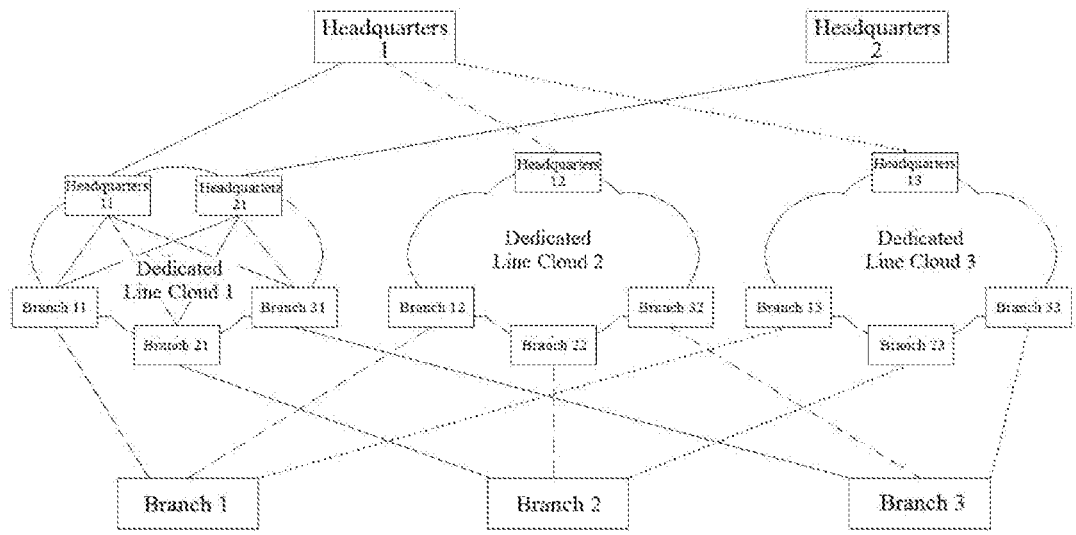
FIG. 7 is a schematic diagram of a further virtual link model corresponding to the application scenario shown in FIG. 5.

With combined reference to FIG. 7, if there is also a headquarters 2 in the above-mentioned SDN architecture, and the headquarters 2 also performs data interaction with the branches 1-3 via the dedicated line 1. In this case, a virtual node (headquarters 21) corresponding to the headquarters 2 is created in the dedicated line cloud 1. In the above, traffic sent from the branch 2 via the dedicated line 1 may comprise traffic sent to the headquarters 1 and traffic sent to the headquarters 2. In other words, the inter-cloud link "branch 2—branch 21" is configured to transmit traffic from the branch 2 to the headquarters 1 and traffic from the branch 2 to the headquarters 2.

Assuming that a bandwidth of 400 Mbps is already allocated on the dedicated line 1 for the traffic from the branch 2 to the headquarters 2 before a path is selected for the traffic from the headquarters 1 to the branch 2, in this case the allocable bandwidth of the inter-cloud link "branch 2—branch 21" is 100 Mbps, which is less than 200 Mbps, therefore the dedicated line 1 does not satisfy the requirement for bandwidth, but the dedicated line 2 can be selected as a traffic forwarding path from the headquarters 1 to the branch 2.

For another example, taking path selection based on the packet loss rate as an example, it is assumed that the packet loss rate from the headquarters 1 via the dedicated line 1 to the branch 2 is 0.1%, the packet loss rate from the headquarters 1 via the dedicated line 2 to the branch 2 is 0.5%, and the packet loss rate from the headquarters 1 via the dedicated line 3 to the branch 2 is 1%.

Then, when it is necessary to select a path from the headquarters 1 to the branch 2, the paths that can be selected may comprise "headquarters 1—headquarters 11—branch 21—branch 2", "headquarters 1—headquarters 12—branch 22—branch 2", and "headquarters 1—headquarters 13—branch 23—branch 2".

Since the packet loss rate of the inter-cloud link could be considered as 0, during the path selection based on the packet loss rate it is necessary to take into consideration the packet loss rate of a link connecting a virtual node corresponding to the headquarters 1 in a target dedicated line cloud and a virtual node corresponding to the branch 2 in the target dedicated line cloud, i.e., the packet loss rates of "headquarters 11—branch 21", "headquarters 12—branch 22", and "headquarters 13—branch 23", which respectively take values of 0.1%, 0.5%, and 1%.

When the preset requirement for quality is that the packet loss rate does not exceed 1%, the SDN controller may select any dedicated line as the traffic forwarding path; when the preset requirement for quality is that the packet loss rate does not exceed 0.5%, the SDN controller may select the dedicated line 1 or a path corresponding to the dedicated line 2 as the traffic forwarding path; and when the preset requirement for quality is that the packet loss does not exceed 0.1%, the SDN controller may select the dedicated line 1 as the traffic forwarding path.

As can be seen from the above description, in the technical solution provided in the present disclosure, a dedicated line cloud corresponding to a dedicated line is created, and a virtual node corresponding to a node is created in the dedicated line cloud. When a traffic scheduling request is received, for each dedicated line cloud comprising both a source virtual node connected with a source node and a destination virtual node connected with a destination node, a dedicated line corresponding to the dedicated line cloud is determined as a traffic forwarding path if it is determined that the static attribute of the link between the source node and the source virtual node and the static attribute of the link between the destination node and the destination virtual node, and/or the dynamic attribute of the link between the source virtual node and the destination virtual node satisfy the requirement for path selection, thereby a path selection based on bandwidth and quality is realized in a point-to-multipoint network.

The method provided in the present disclosure has been described above. An apparatus provided in the present disclosure will be described below.

Figure 8:
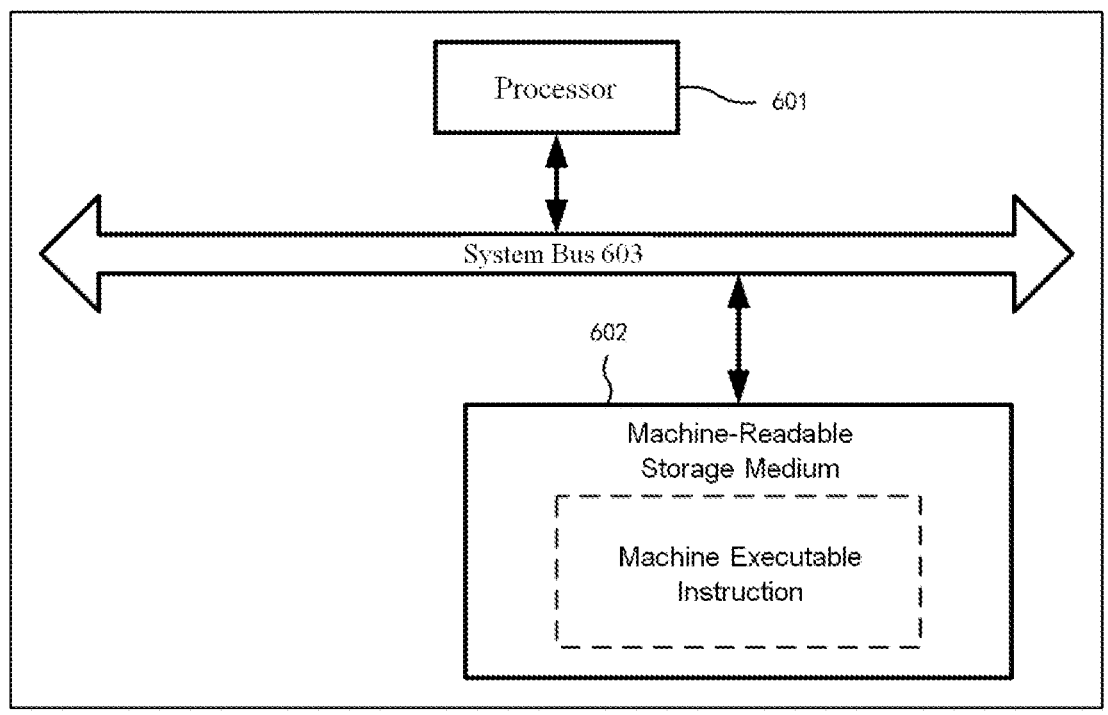
FIG. 8 is a schematic hardware structural diagram of a path selection apparatus provided in the present disclosure.

FIG. 8 is a schematic hardware structural diagram of a path selection apparatus provided in the present disclosure. The path selection apparatus may be an SDN controller, or the path selection apparatus may be an apparatus arranged in the SDN controller, wherein the path selection apparatus at least comprises a processor 601, and a machine-readable storage medium 602 in which machine executable instructions are stored. The processor 601 may communicate with the machine-readable storage medium 602 via a system bus 603. Moreover, the processor 601 may execute the path selection method described above by reading and executing the machine executable instructions in the machine-readable storage medium 602 corresponding to the control logic for the path selection.

The machine-readable storage medium 602 mentioned herein may be any electronic, magnetic, optical, or other physical storage apparatus in which information such as executable instructions, data, and the like may be contained or stored. For example, the machine-readable storage medium may be: a RAM (Random Access Memory), a volatile memory, a non-volatile memory, a flash memory, a storage drive (e.g., a hard disk drive), a solid state drive, any type of storage disk (e.g., an optical disk, DVD, or the like), or a similar storage medium, or a combination thereof.

Figure 9:
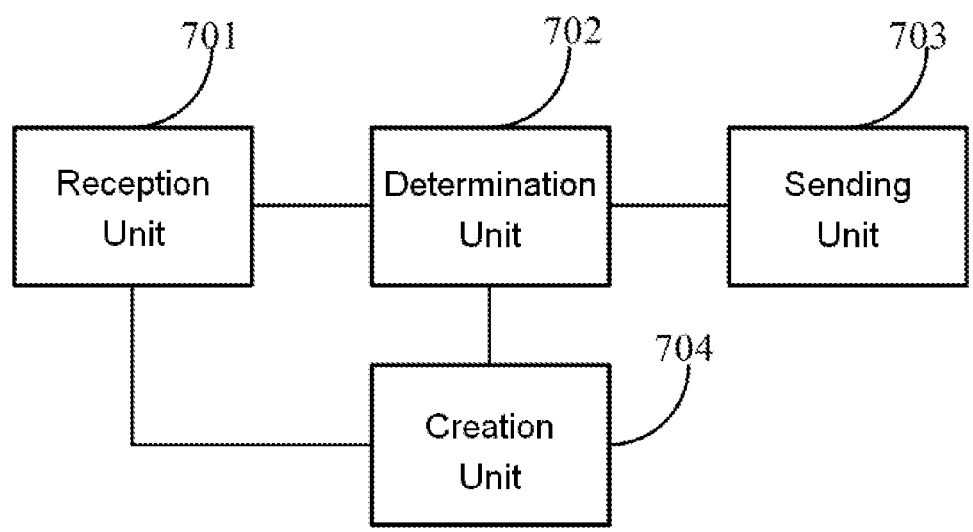
FIG. 9 is a functional structural diagram of a control logic for path selection provided in the present disclosure.

As shown in FIG. 9, when divided functionally, the aforesaid control logic for path selection may comprise a reception unit 701 and a determination unit 702.

In the above, the reception unit 701 is configured to receive a traffic scheduling request, wherein the traffic scheduling request comprises a requirement for path selection, a source node, and a destination node;

the determination unit 702 is configured to determine, for each dedicated line cloud comprising both a source virtual node connected with the source node and a destination virtual node connected with the destination node, a dedicated line corresponding to the dedicated line cloud as a traffic forwarding path, when a static attribute of a link between the source node and the source virtual node and a static attribute of a link between the destination node and the destination virtual node satisfy the requirement for path selection, and/or when a dynamic attribute of a link between the source virtual node and the destination virtual node satisfies the requirement for path selection; and wherein the source virtual node is a mapping node for the source node in the dedicated line cloud connected with the source node, and the destination virtual node is a mapping node for the destination node in the dedicated line cloud connected with the destination node, and each dedicated line cloud is created for a respective dedicated line between the source node and the destination node. In the above, each dedicated line between the source node and the destination node refers to each dedicated line connected with the source node and/or the destination node.

Optionally, the control logic for path selection further comprises: a connection unit configured to connect a source virtual node and a destination virtual node which are in a same dedicated line cloud, after receiving the traffic scheduling request.

Optionally, the control logic for path selection shown in FIG. 9 further comprises:

a sending unit 703 configured to send the traffic forwarding path to the source node.

Optionally, the control logic for path selection shown in FIG. 9 further comprises:

a creation unit 704 configured to create a dedicated line cloud for each dedicated line between the source node and the destination node, wherein the source node is capable of communicating with the destination node via one or more of the dedicated lines; and the creation unit 704 is further configured to: create a source virtual node in a dedicated line cloud corresponding to any dedicated line connected with the source node; and create a destination virtual node in a dedicated line cloud corresponding to any dedicated line connected with the destination node, wherein each of the source virtual nodes corresponds to the source node, and each of the destination virtual nodes corresponds to the destination node.

Optionally, the creation unit 704 is specifically configured to determine the number of dedicated lines between the source node and the destination node according to an obtained attribute of a dedicated line interface, and create a dedicated line cloud for each dedicated line between the source node and the destination node, wherein the attribute of the dedicated line interface comprises one or more of: a node to which the dedicated line interface pertains, a dedicated line to which the dedicated line interface pertains, and a dedicated line cloud to which the dedicated line interface pertains.

Optionally, the creation unit 704 is specifically configured to: create, when it is detected that the source node connected with any dedicated line connects to a dedicated line cloud corresponding to the dedicated line, a source virtual node corresponding to the source node in the dedicated line cloud; and create, when it is detected that the destination node connected with any dedicated line connects to a dedicated line cloud corresponding to the dedicated line, a destination virtual node corresponding to the destination node in the dedicated line cloud.

Optionally, in the present example, the creation unit 704 may be further specifically configured to: after a source virtual node is created in a dedicated line cloud corresponding to any dedicated line connected with the source node, connect a source dedicated line interface of the source node with the created source virtual node, wherein the source dedicated line interface is a dedicated line interface in the source node, and the source dedicated line interface is connected with the dedicated line; and after a destination virtual node is created in a dedicated line cloud corresponding to any dedicated line connected with the destination node, connect a destination dedicated line interface of the destination node with the created destination virtual node, wherein the destination dedicated line interface is an interface in the destination node and the destination dedicated line interface is connected with the dedicated line.

Optionally, the determination unit 702 is further configured to determine an allocable bandwidth of the dedicated line corresponding to the dedicated line cloud comprising the source virtual node as the static attribute of the link between the source node and the source virtual node; and the determination unit 702 is further configured to determine an allocable bandwidth of the dedicated line corresponding to the dedicated line cloud comprising the destination virtual node as the static attribute of the link between the destination node and the destination virtual node.

Optionally, the determination unit 702 is further configured to respectively send an NQA (Network Quality Analyzer) instruction to a source dedicated line interface of the dedicated line corresponding to the dedicated line cloud comprising the source virtual node; and send an NQA instruction to a destination dedicated line interface of the dedicated line corresponding to the dedicated line cloud comprising the destination virtual node; and determine the obtained quality information between the source dedicated line interface and the destination dedicated line interface as the dynamic attribute of the link between the source virtual node and the destination virtual node. In the above, the source dedicated line interface is connected with the source node, and the destination dedicated line interface is connected with the destination node.

Optionally, the determination unit 702 is specifically configured to determine, if the requirement for path selection comprises a requirement for bandwidth and/or a requirement for quality, that the static attribute of the link between the source node and the source virtual node and the static attribute of the link between the destination node and the destination virtual node, and/or the dynamic attribute of the link between the source virtual node and the destination virtual node satisfy the requirement for path selection, when both the static attribute of the link between the source node and the source virtual node and the static attribute of the link between the destination node and the destination virtual node satisfy the requirement for bandwidth, and/or the dynamic attribute of the link between the source virtual node and the destination virtual node satisfies the requirement for quality.

Optionally, the dynamic attribute of the link between the source node and the source virtual node and the dynamic attribute of the link between the destination node and the destination virtual node are optimal; and/or in any dedicated line cloud, the static attribute of a link between the source virtual node and the destination virtual node is optimal.

The structural apparatus shown in FIG. 9 of the present disclosure may be particular hardware on a device, or software or firmware or the like installed on the device. The apparatus provided in the present disclosure is realized based on the same principle and creates the same technical effects as the foregoing example of the method, and for parts of the example of the apparatus that are not mentioned, reference can be made to corresponding disclosure in the foregoing example of the method for the sake of brevity of the description. It will be clearly appreciated by those skilled in the art that for convenience and brevity of description, specific working processes of the system, apparatus, and unit described precedingly may be performed with reference to the corresponding processes in the foregoing example of the method, and will not be described repeatedly herein.

It should be noted that in this text, relation terms such as first, second, and the like are used only for distinguishing one entity or operation from another entity or operation, while it is not necessarily required or implied that these entities or operations have any such practical relation or order. Furthermore, the terms "comprise", "comprise", or any variations thereof are intended to cover non-exclusive inclusions, such that a process, method, article, or device that comprises a list of elements not only comprises those elements, but also comprises other elements not expressly listed or also comprises elements inherent to such process, method, article, or device. Without more restrictions, an element defined with the wording "comprising a . . . " does not exclude the presence of additional identical elements in the process, method, article or device comprising said element.

The above description is only an example of the present disclosure, and is not intended to limit the scope of protection of the present disclosure. Any modifications, equivalent replacements, improvements and so on, made within the spirit and principle of the present disclosure should be comprised within the scope of protection of the present disclosure.

INDUSTRIAL APPLICABILITY

The path selection method and apparatus provided in the present disclosure enable an SDN controller to implement path selection based on bandwidth and quality in a point-to-multipoint network.

The invention claimed is:

1. A path selection method, applicable to a controller in a Software Defined Network (SDN), comprising:
   receiving a traffic scheduling request, wherein the traffic scheduling request comprises a requirement for path selection, a source node, and a destination node; and
   for each dedicated line cloud comprising both a source virtual node connected with the source node and a destination virtual node connected with the destination node, determining a dedicated line corresponding to the dedicated line cloud as a traffic forwarding path, when a static attribute of a link between the source node and the source virtual node and a static attribute of a link between the destination node and the destination virtual node satisfy the requirement for path selection, or when the static attribute of the link between the source node and the source virtual node and the static attribute of the link between the destination node and the destination virtual node, and a dynamic attribute of a link between the source virtual node and the destination virtual node satisfy the requirement for path selection, or when the dynamic attribute of the link between the source virtual node and the destination virtual node satisfies the requirement for path selection,
   wherein the source virtual node is a mapping node for the source node in the dedicated line cloud connected with the source node, and the destination virtual node is a mapping node for the destination node in the dedicated line cloud connected with the destination node, and wherein each dedicated line cloud is created for a respective dedicated line between the source node and the destination node,
   wherein before the receiving a traffic scheduling request, the method further comprises:
   creating a dedicated line cloud for each dedicated line between the source node and the destination node, wherein the source node is capable of communicating with the destination node via one or more of the dedicated lines; and
   creating a source virtual node in a dedicated line cloud corresponding to any dedicated line connected with the source node, and creating a destination virtual node in a dedicated line cloud corresponding to any dedicated line connected with the destination node, wherein each of the source virtual nodes corresponds to the source node, and each of the destination virtual nodes corresponds to the destination node.

2. The path selection method according to claim 1, wherein after the determining a dedicated line corresponding to the dedicated line cloud as a traffic forwarding path, the method further comprises: sending the traffic forwarding path to the source node.

3. The path selection method according to claim 1, wherein after the receiving a traffic scheduling request, the method further comprises: connecting a source virtual node and a destination virtual node which are in a same dedicated line cloud.

4. The path selection method according to claim 1, wherein the creating a dedicated line cloud comprises:
   determining the number of dedicated lines between the source node and the destination node according to an obtained attribute of a dedicated line interface, and creating a dedicated line cloud for each dedicated line between the source node and the destination node, wherein the attribute of the dedicated line interface comprises one or more of: a node to which the dedicated line interface pertains, a dedicated line to which the dedicated line interface pertains, and a dedicated line cloud to which the dedicated line interface pertains.

5. The path selection method according to claim 1, wherein the creating a source virtual node in a dedicated line cloud corresponding to any dedicated line connected with the source node, and the creating a destination virtual node in a dedicated line cloud corresponding to any dedicated line connected with the destination node comprise:
   creating, when it is detected that the source node connected with any dedicated line connects to a dedicated line cloud corresponding to the dedicated line, a source virtual node corresponding to the source node in the dedicated line cloud; and creating, when it is detected that the destination node connected with any dedicated line connects to a dedicated line cloud corresponding to the dedicated line, a destination virtual node corresponding to the destination node in the dedicated line cloud.

6. The path selection method according to claim 5, wherein after the creating a source virtual node in a dedicated line cloud corresponding to any dedicated line connected with the source node, the method further comprises:

connecting a source dedicated line interface of the source node with the created source virtual node, wherein the source dedicated line interface is a dedicated line interface in the source node, and the source dedicated line interface is connected with the dedicated line; and wherein after the creating a destination virtual node in a dedicated line cloud corresponding to any dedicated line connected with the destination node, the method further comprises:

connecting a destination dedicated line interface of the destination node with the created destination virtual node, wherein the destination dedicated line interface is a dedicated line interface in the destination node, and the destination dedicated line interface is connected with the dedicated line.

7. The path selection method according to claim 1, wherein the static attribute of the link between the source node and the source virtual node is determined by: determining an allocable bandwidth of the dedicated line corresponding to the dedicated line cloud comprising the source virtual node as the static attribute of the link between the source node and the source virtual node;

the static attribute of the link between the destination node and the destination virtual node is determined by: determining an allocable bandwidth of the dedicated line corresponding to the dedicated line cloud comprising the destination virtual node as the static attribute of the link between the destination node and the destination virtual node.

8. The path selection method according to claim 1, wherein the dynamic attribute of the link between the source virtual node and the destination virtual node is determined by:

sending a Network Quality Analyzer (NQA) instruction to a source dedicated line interface of the dedicated line corresponding to the dedicated line cloud comprising the source virtual node, and sending an NQA instruction to a destination dedicated line interface of the dedicated line corresponding to the dedicated line cloud comprising the destination virtual node, and determining obtained quality information between the source dedicated line interface and the destination dedicated line interface as the dynamic attribute of the link between the source virtual node and the destination virtual node; wherein the source dedicated line interface is a dedicated line interface in the source node, and the source dedicated line interface is connected with the dedicated line; and wherein the destination dedicated line interface is a dedicated line interface in the destination node, and the destination dedicated line interface is connected with the dedicated line.

9. The path selection method according to claim 1, wherein the requirement for path selection comprises at least one of a requirement for bandwidth and a requirement for quality, and wherein the static attribute of the link between the source node and the source virtual node and the static attribute of the link between the destination node and the destination virtual node satisfy the requirement for path selection, or the static attribute of the link between the source node and the source virtual node and the static attribute of the link between the destination node and the destination virtual node, and the dynamic attribute of the link between the source virtual node and the destination virtual node satisfy the requirement for path selection, or the dynamic attribute of the link between the source virtual node and the destination virtual node satisfies the requirement for path selection, which comprises at least one of the following:

that the static attribute of the link between the source node and the source virtual node and the static attribute of the link between the destination node and the destination virtual node satisfy the requirement for bandwidth; and that the dynamic attribute of the link between the respective source virtual node and the destination virtual node satisfies the requirement for quality.

10. The path selection method according to claim 1, wherein the dynamic attribute of the link between the source node and the source virtual node and the dynamic attribute of the link between the destination node and the destination virtual node are optimal; and the dynamic attribute of the link between the source node and the source virtual node and the dynamic attribute of the link between the destination node and the destination virtual node are optimal, and in any dedicated line cloud, the static attribute of a link between the source virtual node and the destination virtual node is optimal; or in any dedicated line cloud, the static attribute of the link between the source virtual node and the destination virtual node is optimal.

11. A path selection apparatus, applicable to a controller in a Software Defined Network (SDN), comprising:

a reception unit to receive a traffic scheduling request, wherein the traffic scheduling request comprises a requirement for path selection, a source node, and a destination node; and a determination unit to determination, for each dedicated line cloud comprising both a source virtual node connected with the source node and a destination virtual node connected with the destination node, a dedicated line corresponding to the dedicated line cloud as a traffic forwarding path, when a static attribute of a link between the source node and the source virtual node and a static attribute of a link between the destination node and the destination virtual node satisfy the requirement for path selection, or when the static attribute of the link between the source node and the source virtual node and the static attribute of the link between the destination node and the destination virtual node, and a dynamic attribute of a link between the source virtual node and the destination virtual node satisfy the requirement for path selection, or when the dynamic attribute of the link between the source virtual node and the destination virtual node satisfies the requirement for path selection, wherein the source virtual node is a mapping node for the source node, in the dedicated line cloud connected with the source node, and the destination virtual nodes is a mapping node for the destination node in the dedicated line cloud connected with the destination node, and wherein each dedicated line cloud is created for a respective dedicated line between the source node and the destination node, wherein the path selection apparatus further comprises a creation unit to:

create a dedicated line cloud for each dedicated line between the source node and the destination node, wherein the source node is capable of communicating with the destination node via one or more of the dedicated lines; and create a source virtual node in a dedicated line cloud corresponding to any dedicated line connected with the source node; and create a destination virtual node in a dedicated line cloud corresponding to any dedicated line connected with the destination node, wherein each of the source virtual nodes corresponds to the source node, and each of the destination virtual nodes corresponds to the destination node.

12. An SDN controller, comprising at least:

a processor; and a machine-readable storage medium storing machine executable instructions, wherein the processor executes the path selection method according to claim 1 when the processor invokes and executes the machine executable instructions in the machine-readable storage medium.

13. A non-transitory machine-readable storage medium, wherein the non-transitory machine-readable storage medium stores machine executable instructions that, when invoked and executed by a processor, cause the processor to execute the path selection method according to claim 1.

* * * * *